ns>

(12) United States Patent
Izumi et al.

(10) Patent No.: US 9,648,459 B2
(45) Date of Patent: May 9, 2017

(54) INFORMATION PROCESSING DEVICE, TERMINAL SEPARATION DETERMINATION SYSTEM AND TERMINAL SEPARATION DETERMINATION METHOD

(71) Applicant: Hitachi, Ltd., Tokyo (JP)

(72) Inventors: Yoshifumi Izumi, Tokyo (JP); Yosuke Uetake, Tokyo (JP); Toshio Yamashita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/931,976

(22) Filed: Nov. 4, 2015

(65) Prior Publication Data
US 2016/0157058 A1 Jun. 2, 2016

(30) Foreign Application Priority Data
Nov. 27, 2014 (JP) ................. 2014-240277

(51) Int. Cl.
*H04W 24/00* (2009.01)
*H04W 4/02* (2009.01)
*G01S 5/02* (2010.01)

(52) U.S. Cl.
CPC ........... *H04W 4/023* (2013.01); *G01S 5/0284* (2013.01); *H04W 4/025* (2013.01)

(58) Field of Classification Search
None
See application file for complete search history.

(56) References Cited

U.S. PATENT DOCUMENTS

2003/0020623 A1    1/2003  Cao et al.
2013/0143673 A1*   6/2013  Yamamoto ............ A63F 13/216
                                                              463/42

FOREIGN PATENT DOCUMENTS

JP          10-79793 A       9/1998
JP       2004-533739 A      11/2004

OTHER PUBLICATIONS

Extended European Search Report received in corresponding European Application No. 15193842.0 dated May 6, 2016.

* cited by examiner

*Primary Examiner* — Shantell L Heiber
(74) *Attorney, Agent, or Firm* — Mattingly & Malur, PC

(57) ABSTRACT

An information processing device includes: a communication unit that receives positions from a plurality of terminals each capable of calculating a position indicating a latitude and a longitude; an area determination unit that makes a decision, based upon the positions received at the communication unit, as to in which of areas defined in advance based upon latitudes and longitudes thereof, the terminals are located; and a separation determination unit that calculates an extent of separation to which an area where one terminal is located and an area where another terminal is located are separated from each other, and determines whether a predetermined relationship is achieved with regard to the extent of separation between the one terminal and the other terminal.

4 Claims, 15 Drawing Sheets

FIG.2

POSITION · TIME POINT DATABASE

| TERMINAL ID | POSITION INFORMATION LATITUDE, LONGITUDE | POSITION ACQUISITION TIME POINT |
|---|---|---|
| 10001 | 43.6, 143.1 | 2014/10/10 8:50 |
| 10002 | 43.1, 143.4 | 2014/10/10 8:51 |
| 10003 | 40.4, 140.0 | 2014/10/10 8:58 |
| 10004 | 45.1, 145.2 | 2014/10/10 8:52 |
| . | . | . |

POSITION · TIME POINT · RANGE DATABASE — 22b

| TERMINAL ID | POSITION INFORMATION LATITUDE, LONGITUDE | POSITION ACQUISITION TIME POINT | AREA IDENTIFIER | TIME POINT IDENTIFIER |
|---|---|---|---|---|
| 10001 | 40.9, 141.1 | 2014/10/10 8:36 | aaa-002 | 2014-10-10_083 |
| 10001 | 41.4, 142.1 | 2014/10/10 8:41 | aab-003 | 2014-10-10_084 |
| 10001 | 43.2, 143.3 | 2014/10/10 8:50 | aad-004 | 2014-10-10_085 |
| 10002 | 42.1, 144.6 | 2014/10/10 8:31 | aac-005 | 2014-10-10_083 |
| . | | | | |

FIG.4

PATH CROSSING INFORMATION DATABASE 22c

| FIRST TERMINAL ID | FIRST TERMINAL POSITION LATITUDE, LONGITUDE | SECOND TERMINAL ID | SECOND TERMINAL POSITION LATITUDE, LONGITUDE | PATH CROSSING TIME POINT |
|---|---|---|---|---|
| 10001 | 43.2, 143.3 | 10002 | 43.1, 143.4 | 2014/10/10 8:50 |
| 10001 | 43.6, 143.1 | 10003 | 43.7, 143.3 | 2014/10/10 12:10 |
| 10005 | 55.1, 130.0 | 10010 | 55.2, 130.1 | 2014/10/10 8:30 |

FIG.5

| | REFERENCE | STARTING SIGN | NEXT SIGN | WIDTH |
|---|---|---|---|---|
| LATITUDE | 40.00° | aaa | aab | 1° |
| LONGITUDE | 140.00° | 001 | 002 | 1° |

22d

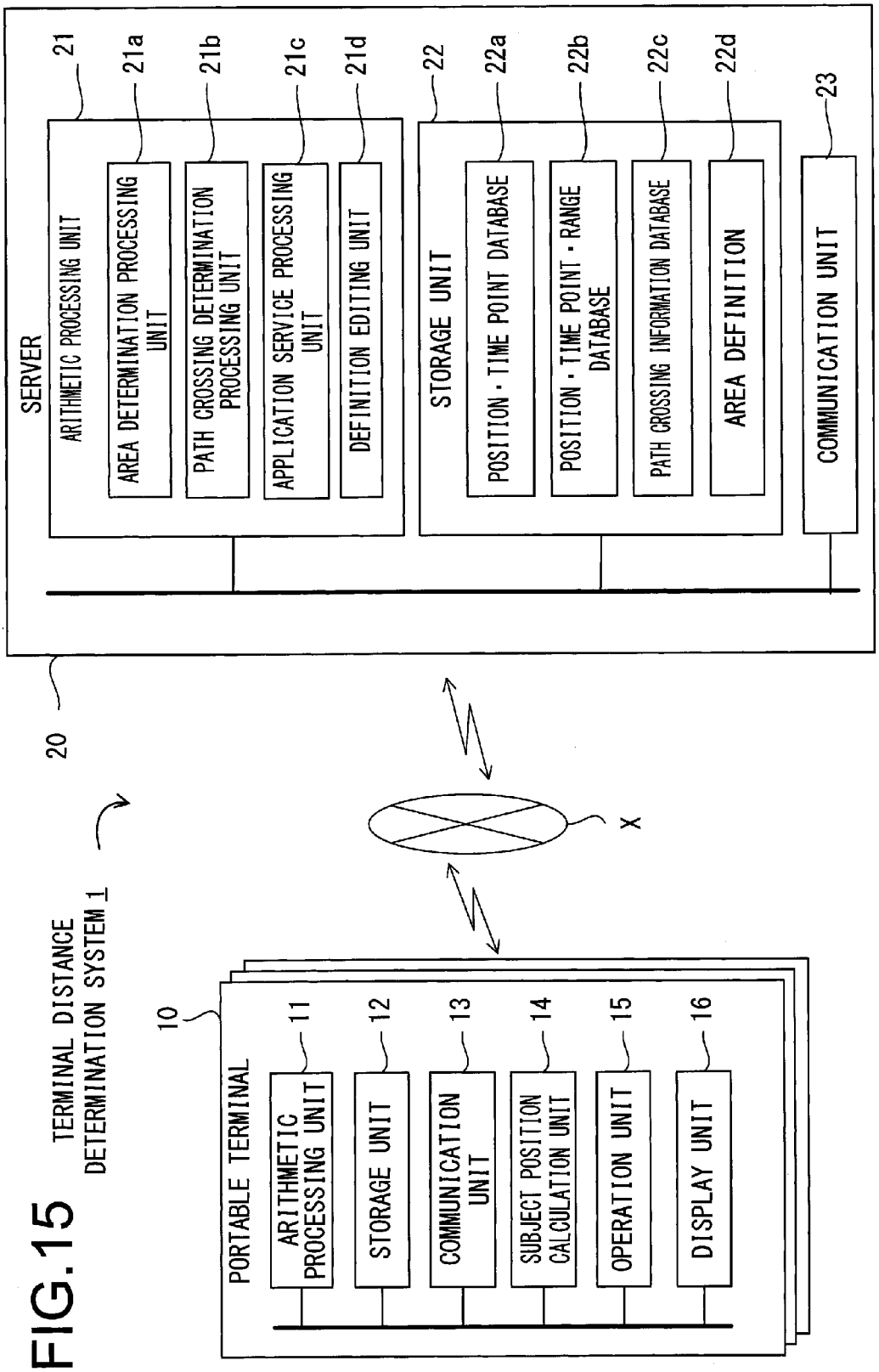

INFORMATION PROCESSING DEVICE, TERMINAL SEPARATION DETERMINATION SYSTEM AND TERMINAL SEPARATION DETERMINATION METHOD

INCORPORATION BY REFERENCE

The disclosure of the following priority application is herein incorporated by reference: Japanese Patent Application No. 2014-240277, filed Nov. 27, 2014

BACKGROUND OF THE INVENTION

1. Field of the Invention

The present invention relates to an information processing device, a terminal separation determination system and a terminal separation determination method.

2. Description of Related Art

Japanese Patent Application Publication No. 2004-533739 discloses a system that identifies terminals located within a predetermined distance by calculating distances between terminals through a calculation formula based upon latitudes and longitudes calculated in conjunction with GPS information.

SUMMARY OF THE INVENTION

The invention disclosed in the literature quoted above poses a challenge in that since it requires the distances between all the terminals designated as targets to be calculated, terminals located within the predetermined distance among the numerous terminals cannot be identified in a quick and simple manner.

An information processing device according to a first aspect of the present invention, comprises: a communication unit that receives positions from a plurality of terminals each capable of calculating a position indicating a latitude and a longitude; an area determination unit that makes a decision, based upon the positions received at the communication unit, as to in which of areas defined in advance based upon latitudes and longitudes thereof, the terminals are located; and a separation determination unit that calculates an extent of separation to which an area where one terminal is located and an area where another terminal is located are separated from each other, and determines whether a predetermined relationship is achieved with regard to the extent of separation between the one terminal and the other terminal.

According to a second aspect of the present invention, in the information processing device according to the first aspect, it is preferable that the areas are assigned with identifiers that enable calculation of the extent of separation; and the separation determination unit calculates the extent of separation between the areas by using the identifiers assigned to the areas.

According to a third aspect of the present invention, in the information processing device according to the first or second aspect, it is preferred to further comprise: a distance determination unit that calculates a distance between the one terminal and the other terminal having been determined by the separation determination unit to achieve the predetermined relationship and determines whether a predetermined relationship is achieved with regard to the distance having been calculated.

According to a fourth aspect of the present invention, in the information processing device according to any one of the first to third aspects, it is preferable that: position acquisition time points at which the positions have been obtained are appended to the positions; and the separation determination unit designates terminals having a position acquisition time point difference falling within a predetermined range as processing targets and executes processing on the processing targets thus designated.

According to a fifth aspect of the present invention, in the information processing device according to the fourth aspect, it is preferred to further comprise: a time point identifier assigning unit that assigns a common time point identifier if position acquisition time points received at the communication unit fall within a predetermined temporal range, wherein: the separation determination unit designates terminals with the common time point identifier assigned thereto by the time point identifier assigning unit as processing targets and executes processing on the processing targets thus designated.

According to a sixth aspect of the present invention, in the information processing device according to any one of the first to fifth aspects. it is preferred to further comprise: an area size specifying unit that specifies a size of the areas.

A terminal separation determination system configured with a server and a plurality of terminals connected via a network, according to a seventh aspect of the present invention comprises: a position calculation unit that calculates a position indicated as a latitude and a longitude of each of the terminals; an area determination unit that identifies, based upon a position of a terminal having been calculated, an area among a plurality of areas defined based upon latitudes and longitudes thereof, where the terminal is located; and a separation determination unit that determines, based upon an extent of separation to which an area where one terminal is located and an area where another terminal is located are set apart from each other, whether a predetermined relationship is achieved with regard to the extent of separation between the one terminal and the other terminal.

According to an eighth aspect of the present invention, in the terminal separation determination system according to the seventh aspect, it is preferable that: the separation determination unit is installed in the server; the position calculation unit and the area determination unit are installed in each of the terminals; and the terminals each transmit the identified area to the server.

According to a ninth aspect of the present invention, in the terminal separation determination system according to the seventh aspect, it is preferable that: the separation determination unit and the area determination unit are installed in the server; the position calculation unit is installed in each of the terminals; and the terminals each transmit the position having been calculated to the server.

A terminal separation determination method, according to a tenth aspect of the present invention comprises: making a decision, based upon a position calculated at a terminal and indicating a latitude and a longitude thereof, as to in which of areas defined in advance based upon latitudes and longitudes thereof the terminal is located; and calculating an extent of separation to which an area where one terminal is located and an area where another terminal is located are separated from each other and determining whether a predetermined relationship is achieved with regard to the extent of separation between the one terminal and the other terminal.

BRIEF DESCRIPTION OF THE DRAWINGS

FIG. 2 presents an example of the position • time point database.

FIG. 3 presents an example of the position • time point • range database.

FIG. 4 presents an example of the path crossing information database.

FIG. 5 presents an example of the area definition.

FIG. 15 is a block diagram illustrating the configuration of the terminal distance determination system achieved in variation 6.

DESCRIPTION OF EMBODIMENTS (First Embodiment)

The following is a description of an embodiment of the terminal separation determination system according to the present invention, given in reference to FIGS. 1 through 10.

Figure 1:
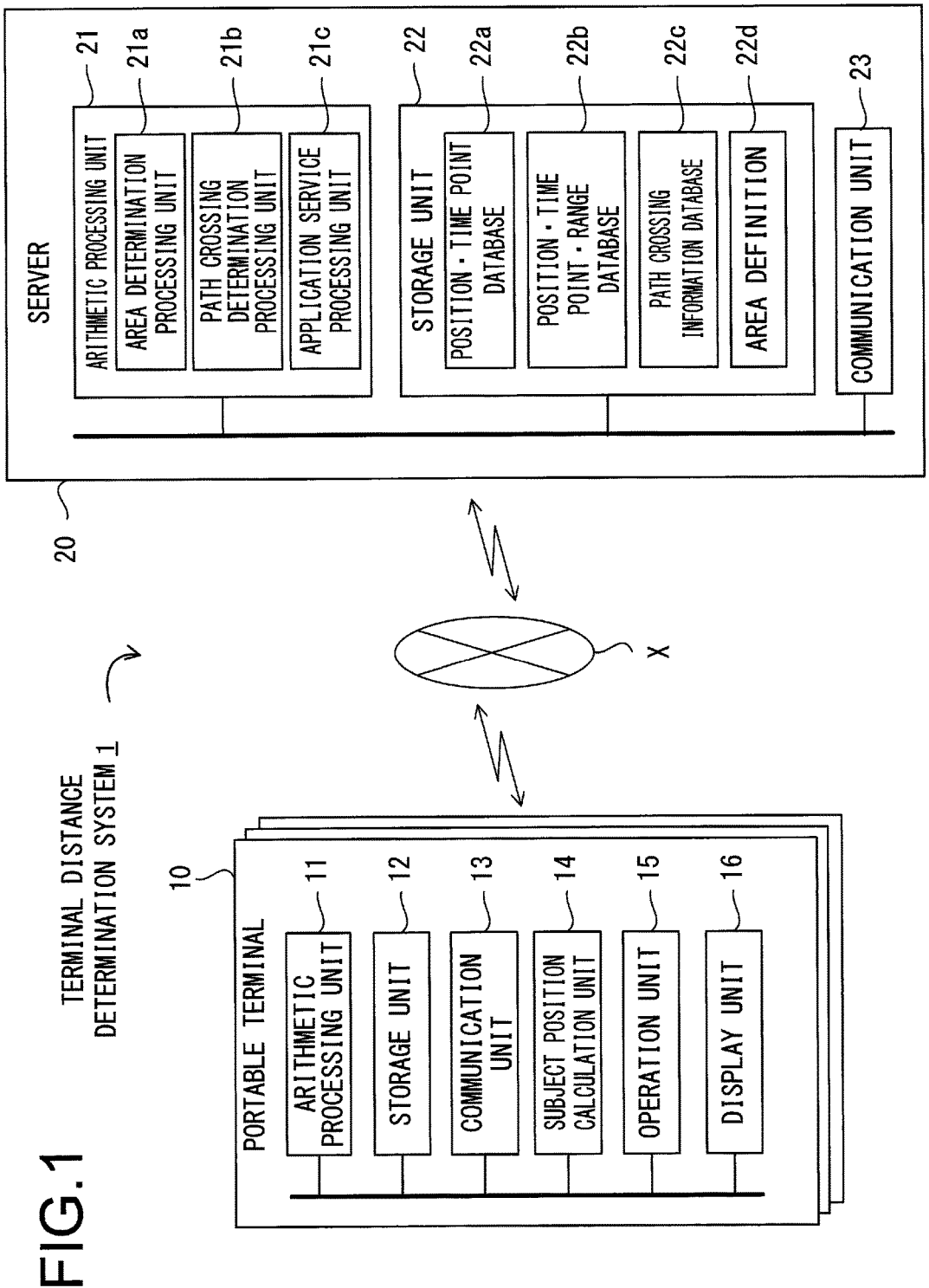
FIG. 1 is a block diagram illustrating the configuration of a terminal distance determination system achieved as an embodiment of the present invention.

FIG. 1 is a block diagram illustrating the configuration of a terminal distance determination system 1 achieved as an embodiment of the terminal separation determination system according to the present invention. The terminal distance determination system 1 is configured with a plurality of portable terminals 10 and a server 20. The portable terminals 10 tend to be scattered over a wide range. The portable terminals 10 and the server 20 are connected to a network X via which they are able to communicate with one another.

A portable terminal 10, which may be, for instance, a mobile telephone, includes an arithmetic processing unit 11 that executes overall control of processing, a storage unit 12 where application programs are recorded, a communication unit 13 that communicates with the server 20, a subject position calculation unit 14 that calculates the position of a subject terminal, i.e., its own position, an operation unit 15 and a display unit 16. The arithmetic processing unit 11, the storage unit 12, the communication unit 13, the subject position calculation unit 14, the operation unit 15 and the display unit 16 are connected via a communication bus.

The arithmetic processing unit 11, configured with a CPU, a ROM and a RAM, executes a program stored in the storage unit 12 by loading it in the RAM. The arithmetic processing unit 11 has a clock function that enables it to output the current time point. Since the time is corrected as needed through a current time point calculation function of the subject position calculation unit 14, the current time point output by the arithmetic processing unit 11 is accurate. The arithmetic processing unit 11 outputs a subject position calculation command to the subject position calculation unit 14 over predetermined time intervals, e.g., every 10 minutes. The arithmetic processing unit 11 transmits the subject position calculated by the subject position calculation unit 14, a terminal ID used as an inherent identifier and the current time point to the server 20.

In the storage unit 12 configured with a flash memory, application programs and the terminal ID, which is an identifier inherent to the particular portable terminal, are stored. The communication unit 13 engages in communication with the server 20 and other portable terminals 10 via the network X. The subject position calculation unit 14 may be, for instance, a GPS receiver. In response to a request issued by the arithmetic processing unit 11, the subject position calculation unit 14 calculates the subject position, i.e., the latitude and the longitude of the current position of the portable terminal 10, based upon signals received from a plurality of satellites. The latitude and the longitude are output to the arithmetic processing unit 11. In addition, the subject position calculation unit 14 is able to ascertain the accurate current time through the process of the subject position calculation, and accordingly, the current time point indicated on the clock in the arithmetic processing unit 11 is corrected based upon this current time point. The operation unit 15 may be, for instance, a pushbutton, through which a user input is output to the arithmetic processing unit 11. At the display unit 16, which may be configured with a liquid crystal display unit, a video image is brought up on display in response to an instruction issued by the arithmetic processing unit 11.

The server 20 comprises an arithmetic processing unit 21 that executes overall control of processing, a storage unit 22 in which databases holding data aggregates are stored, and a communication unit 23. The arithmetic processing unit 21, the storage unit 22 and the communication unit 23 are connected through a communication bus.

The arithmetic processing unit 21, configured with a CPU, a ROM and a RAM, executes a program stored in the ROM by loading it in the RAM. FIG. 1 provides a conceptual diagram of primary functions executed in the arithmetic processing unit 21. The arithmetic processing unit 21 includes an area determination processing unit 21a that executes preliminary processing on data received from the portable terminals 10, a path crossing determination processing unit 21b that makes a decision as to whether or not a given portable terminal 10 and another portable terminal 10 are located within a distance equal to or less than a predetermined value from each other and an application service processing unit 21c.

The area determination processing unit 21a reads data recorded in a position • time point database 22a one record at a time, appends an area identifier and a time identifier to each record and saves the processed data into a position • time point • range database 22b, after each predetermined time interval, e.g., every 10 minutes. The records, having undergone this processing, are deleted from the position • time point database 22a. The path crossing determination processing unit 21b starts its operation as specific data are input from the application service processing unit 21c. The path crossing determination processing unit 21b reads through the position • time point • range database 22b, identifies portable terminals 10 that are apart from each other by a distance equal to or less than a predetermined value and saves determination results into a path crossing information database 22c. The application service processing unit 21c outputs a command for the path crossing determination processing unit 21b so as to prompt it to output information indicating a combination of portable terminals 10 apart from each other by a distance equal to or less than the predetermined value, to the path crossing information database 22c. Then it executes an application program by designating the portable terminals 10 entered in the path crossing information database 22c as processing targets.

In the storage unit 22, which may be, for instance, a magnetic disk, the position • time point database 22a, the position • time point • range database 22b, the path crossing information database 22c and an area definition 22d are stored. The position • time point database 22a, the position • time point • range database 22b and the path crossing information database 22c will be described in detail later in reference to FIGS. 2 through 4.

In the position • time point database 22a, information provided from the portable terminals 10 and received at the communication unit 23 is stored. The entire data in the position • time point database 22a are read through the processing executed by the area determination processing unit 21a after each predetermined time interval, and once the processing executed by the area determination processing unit 21a is completed, the data having been read are deleted. Namely, the number of records stored in the position • time point database 22a increases each time data are received from a portable terminal 10 and is cleared to zero once the predetermined interval has elapsed.

The records prepared by the area determination processing unit 21a are saved into the position • time point • range database 22b. The path crossing determination processing unit 21b reads the data in the position • time point • range database 22b in part or in their entirety. However, it is distinguishable from the position • time point database 22a in that the records having been read are not deleted.

Records created by the path crossing determination processing unit 21b, each holding information pertaining to a combination of portable terminals 10 having been judged to be located at or within the predetermined distance from each other, are saved in the path crossing information database 22c. The information in the path crossing information database 22c is read by the application service processing unit 21c and when it is no longer needed, the application service processing unit 21c deletes all the records stored in the path crossing information database 22c.

The area definition 22d defines areas and area identifiers. The areas are defined as regions formed by dividing a map in a mesh pattern. An area identifier is expressed as a combination of a sign indicating the latitude and a sign indicating the longitude, and numerals and alphabetic characters may be used as such signs. The area identifiers, expressed with numerals assigned in ascending order and alphabetic characters assigned in alphabetic order in line with the positional arrangement of the individual mesh areas, enable calculation of the extent of separation between two areas. In the embodiment, the extent of separation between areas is defined as either the value indicating the distance between the areas along the latitudinal direction or the value indicating the distance between the areas along the longitudinal direction, that is greater than the other.

The communication unit 23 is engaged in communication with the portable terminals 10 via the network X.

(Databases)

In reference to FIGS. 2 through 4, examples of the position • time point database 22a, the position • time point • range database 22b and the path crossing information database 22c will be described.

FIG. 2 presents an example of the position • time point database 22a. The position • time point database 22a is made up with a plurality of records, and each record is constituted with a terminal ID, position information indicating a latitude and a longitude, and a position acquisition time point. The terminal ID is an ID inherent to a specific portable terminal 10 that enables identification thereof, the position information indicates the latitude and the longitude calculated by the subject position calculation unit 14 in the portable terminal 10, and the position acquisition time point is the date/time at which the position information is acquired by the subject position calculation unit 14. In the example presented in FIG. 2, there are four records pertaining to four terminals assigned with terminal IDs 10001 through 10004. As explained earlier, the data saved in the position • time point database 22a are read and deleted over the predetermined time intervals, and thus, only data having been received from portable terminals 10 following the completion of the previous session of processing by the area determination processing unit 21a are saved in the position • time point database 22a at any given time.

FIG. 3 presents an example of the position • time point • range database 22b. The position • time point • range database 22b is made up with a plurality of records, and each record is constituted with a terminal ID, position information, a position acquisition time point, an area identifier and a time point identifier. Among these, the terminal ID, the position information and the position acquisition time point are identical to those saved in the position • time point database 22a. The area identifier is an identifier indicating the area that contains the position indicated by the position information. The area identifier is calculated by the area determination processing unit 21a. In the example presented in FIG. 3, the latitude and the longitude respectively correspond to the first half and the second half of the area identifier. In line with the area definition 22d, which will be described later, each time the latitude, starting at 40°, increases by 1°, the first half of the area identifier goes up from aaa to aab, and then from aab to aac, and each time the longitude, starting at 140°, increases by 1°, the second half of the area identifier goes up from 001 to 002, and then from 002 to 003. The time point identifier is an identifier used to judge, in a simplified manner, the simultaneity of time points and, is assigned to each record by the area determination processing unit 21a. The area determination processing unit 21a executes processing on all the records saved in the position • time point database 22a over the predetermined time intervals of, for example, 10 minutes, and through this processing, it creates an identifier based upon the time point at which the processing session starts. Since the area determination processing unit 21a executes the processing every 10 minutes, a common time point identifier "2014-10-10_083" is assigned to the record at the top and the record at the bottom containing data with the position information thereof having been obtained at 8:36 and 8:31 respectively.

FIG. 4 presents an example of the path crossing information database 22c. The path crossing information database 22c is made up with a plurality of records, and each record is constituted with a first terminal ID, a first terminal position, a second terminal ID, a second terminal position and a position acquisition time point. The first terminal ID, the first terminal position and the position acquisition time point are all information pertaining to a first terminal, whereas the second terminal ID and the second terminal position are information pertaining to a second terminal having been determined to be in a path crossing relation to the first terminal.

(Area Identifiers)

Figure 6:
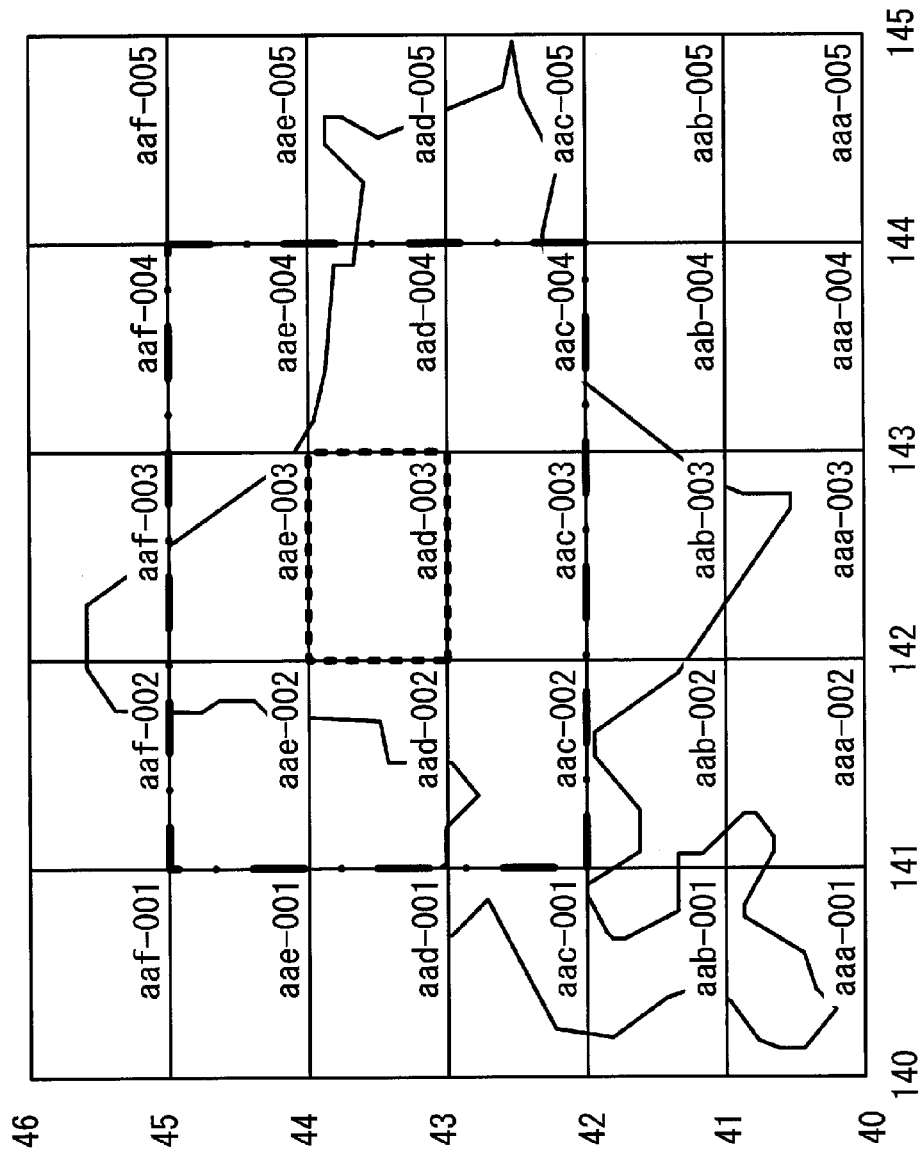
FIG. 6 presents examples of areas and area identifiers.

In reference to FIGS. 5 and 6, area identifiers and extents of separation between areas will be described.

FIG. 5 presents an example of the area definition 22d. The definition entered in the upper row in FIG. 5 indicates that a reference latitude is 40.00° and that the width of each area measured along the latitudinal direction, i.e., the mesh pitch, is 1°. In addition, the sign corresponding to 40°~41° is "aaa" and the sign corresponding to 41°~42° is "aab". Likewise, the definition entered in the lower row in FIG. 5 indicates that a reference longitude is 140.00° and that the width of each area measured along the longitudinal direction is 1°. The sign corresponding to 140°~141° is "001", whereas the sign corresponding to 141°~142° is "002".

FIG. 6 presents examples of areas and area identifiers generated in line with the rules set forth in the area definition 22d in FIG. 5. As indicated in FIG. 5, the "width" of an area is equivalent to 1° both along the latitudinal direction and along the longitudinal direction. This means that each of the meshes in FIG. 6 ranges over a latitudinal width and a longitudinal width both equivalent to 1°. Each time the latitude increases by 1°, the latitudinal sign changes from "aaa" to "aab", from "aab" to "aac" . . . , whereas each time the longitude increases by 1°, the longitudinal sign changes from "001" to "002", from "002" to "003" . . . .

In this description, the extent of separation between areas is defined as either the value indicating the distance between the areas along the latitudinal direction or the value indicating the extents of separation between them along the longitudinal direction that is greater than the other. For instance, the extent of separation between an area "aaa-001" and an area "aaa-003" is 2, since they share the same latitudinal sign and the difference between their longitudinal signs "001" and "003" is 2. The area "aaa-001" and an area "aad-002" are set apart from each other by 1 along the longitudinal direction and by 3 along the latitudinal direction, representing the difference between "a" in the latitudinal sign "aaa" and "d" in the latitudinal sign "aad" in alphabetic order. Accordingly, the larger value 3 of the values 1 and 3 represents the extent of separation between these areas. In other words, the separation range of 1 set in reference to an area "aad-003" indicated by the dotted line in FIG. 6 is a range from "aac-002" through "aae-004", which includes nine areas, as indicated by the one-point chain line in FIG. 6.

(Data Flow)

In reference to FIG. 7, the flow of data in the terminal distance determination system will be described.

Figure 7:
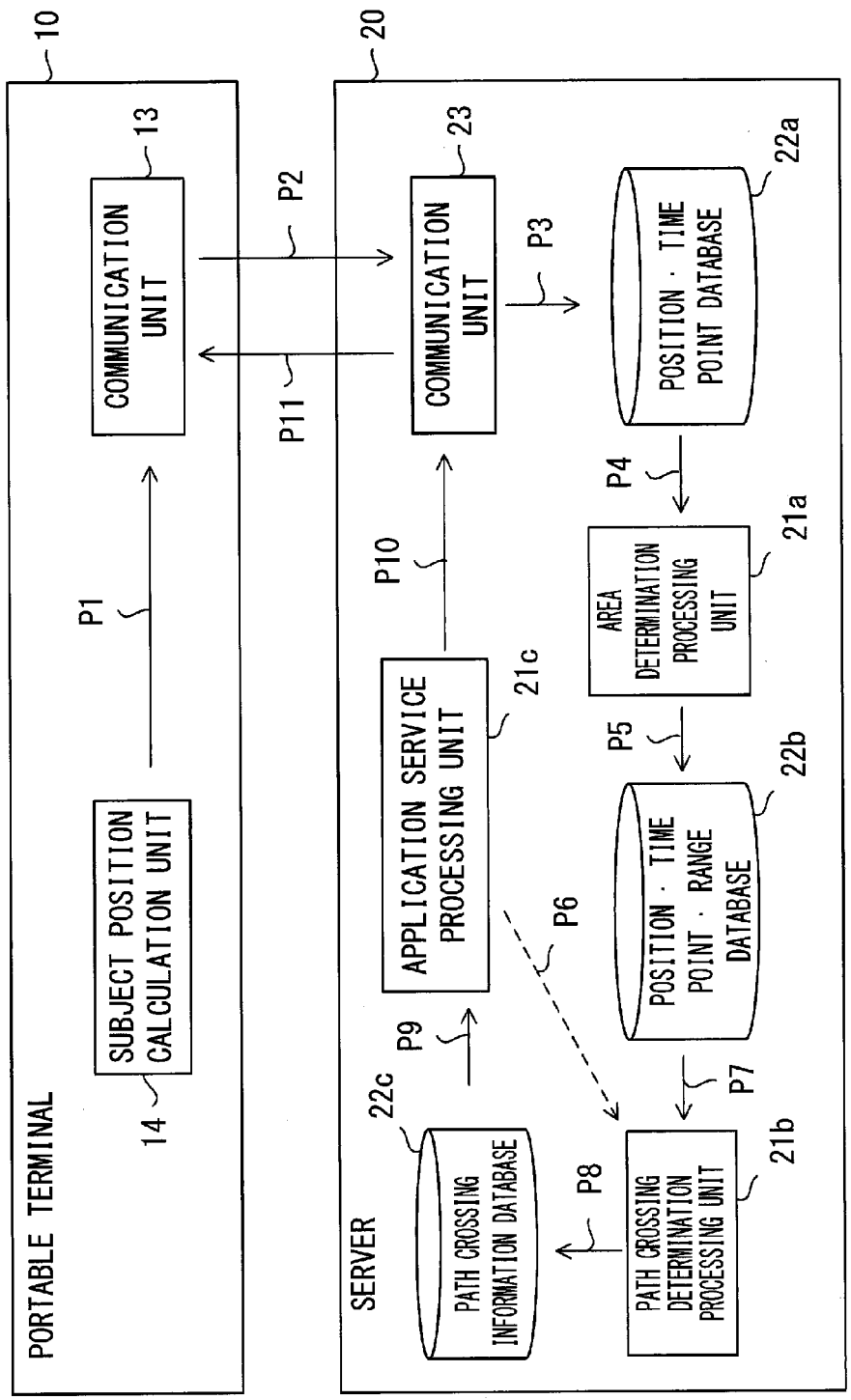
FIG. 7 illustrates how data flow in the terminal distance determination system.

FIG. 7 is a conceptual diagram illustrating how data flow when the application service processing unit 21c executes processing based upon subject positions obtained at the portable terminals 10.

The subject position calculation unit 14 in a portable terminal 10 calculates the subject position over predetermined time intervals and outputs the subject position thus calculated to the communication unit 13 (P1 in FIG. 7). The communication unit 13 transmits the position acquisition time point at which the subject position has been calculated and the terminal ID of the particular portable terminal 10, together with the subject position having been calculated, to the server 20 (P2 in FIG. 7).

Each time information originating from a portable terminal 10 is received, the communication unit 23 at the server 20 saves the subject position, the position acquisition time point and the terminal ID having been received into the position • time point database 22a (P3 in FIG. 7). The area determination processing unit 21a reads the entire data in the position • time point database 22a over the predetermined time intervals (P4 in FIG. 7), appends an area identifier and a time point identifier to each record and saves the individual records with the area identifiers and the time point identifiers appended thereto to the position • time point • range database 22b (P5 in FIG. 7).

The path crossing determination processing unit 21b starts operation as terminal narrowing down conditions and path crossing determination conditions are input thereto from the application service processing unit 21c (P6 in FIG. 7). The path crossing determination processing unit 21b reads the data in the position • time point • range database 22b (P7 in FIG. 7), extracts any combination of portable terminals 10 satisfying predetermined conditions and outputs the extracted combination to the path crossing information database 22c (P8 in FIG. 7). The terminal narrowing down conditions output by the application service processing unit 21c include a condition pertaining to the position acquisition time points or the time point identifiers corresponding to portable terminals 10. The path crossing determination conditions output by the application service processing unit 21c pertain to a specific number of areas for judging a path crossing state and a specific distance used to determine the path crossing state.

The application service processing unit 21c reads the data in the path crossing information database 22c (P9 in FIG. 7) executes specific processing and transmits various types of data to the portable terminals 10 via the communication unit 23 (P10 and P11 in FIG. 7).

Since the position information and the position acquisition time point corresponding to each portable terminal 10 are saved as a record with identifiers appended thereto in the position • time point • range database 22b, the path crossing determination processing unit 21b is able to extract portable terminals 10 satisfying the conditions with a high level of efficiency.

(Area Determination Processing)

Figure 8:
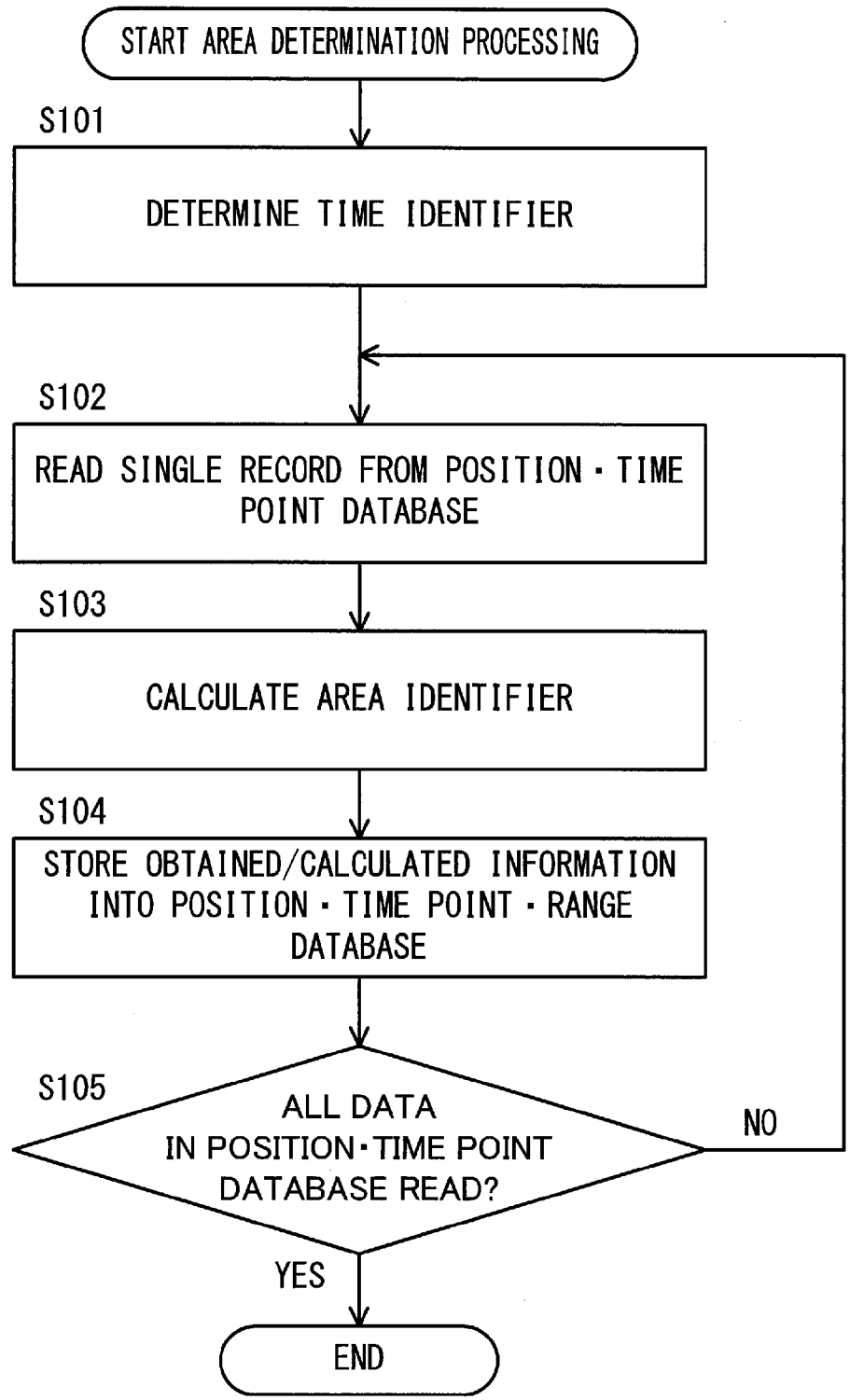
FIG. 8 presents a flowchart of the operation executed by an area determination processing unit.

FIG. 8 presents a flowchart of the operation executed by the area determination processing unit 21a. The CPU in the arithmetic processing unit 21 is responsible for carrying out the execution of the various steps described below.

In step S101, the area determination processing unit 21a obtains the current time point and creates a time point identifier based upon the current time point thus obtained. Time point identifiers allow a decision to be made as to whether position acquisition time points are the same or different and a decision as to whether or not position acquisition time points are successive with ease. The area determination processing unit 21a assigns a common time point identifier to data it processes through a single session. Assuming that the area determination processing unit 21a executes the processing over 10-minute intervals, the time point identifier should be incremented by 1 for each new session of processing. For instance, the time identifier appended to a record indicating a current time point 8:11, October 10, 2014 will be "2014-10-10_081". If the processing is executed every hour, on the other hand, a time point identifier "2014-10-10_08" will be appended. The operation then proceeds to step S102.

In step S102, the area determination processing unit 21a reads a single record, i.e., a single set of data indicating a terminal ID, a position information and a position acquisition time point, from the position • time point database 22a. The operation then proceeds to step S103.

In step S103, the area determination processing unit 21a calculates an area identifier based upon the position information having been read in step S102 in line with the area definition 22d, and then the operation proceeds to step S104. For instance, with the reference point coordinates and the areal widths set as defined in the area definition 22d in FIG. 5, a position at 41° 2' latitude and 142° 6' longitude will fall into an area taking up the second areal position along the latitudinal direction and the third areal position along the longitudinal direction, and accordingly, an area identifier "aab-003" will be calculated.

In step S104, the area determination processing unit 21a stores the time identifier having been determined in step S101, the terminal ID, the position information and the position acquisition time point having been read in step S102 and the area identifier having been calculated in step S103 into the position • time point • range database 22b before the operation proceeds to step S105.

In step S105, the area determination processing unit 21a makes a decision as to whether or not all the records stored in the position • time point database 22a have been read. Upon deciding that all the records have been read, the program executed as shown in the flowchart presented in FIG. 8 ends, whereas upon deciding that not all the records have been read yet, the operation returns to step S102.

(Path Crossing Determination Processing)

Figure 9:
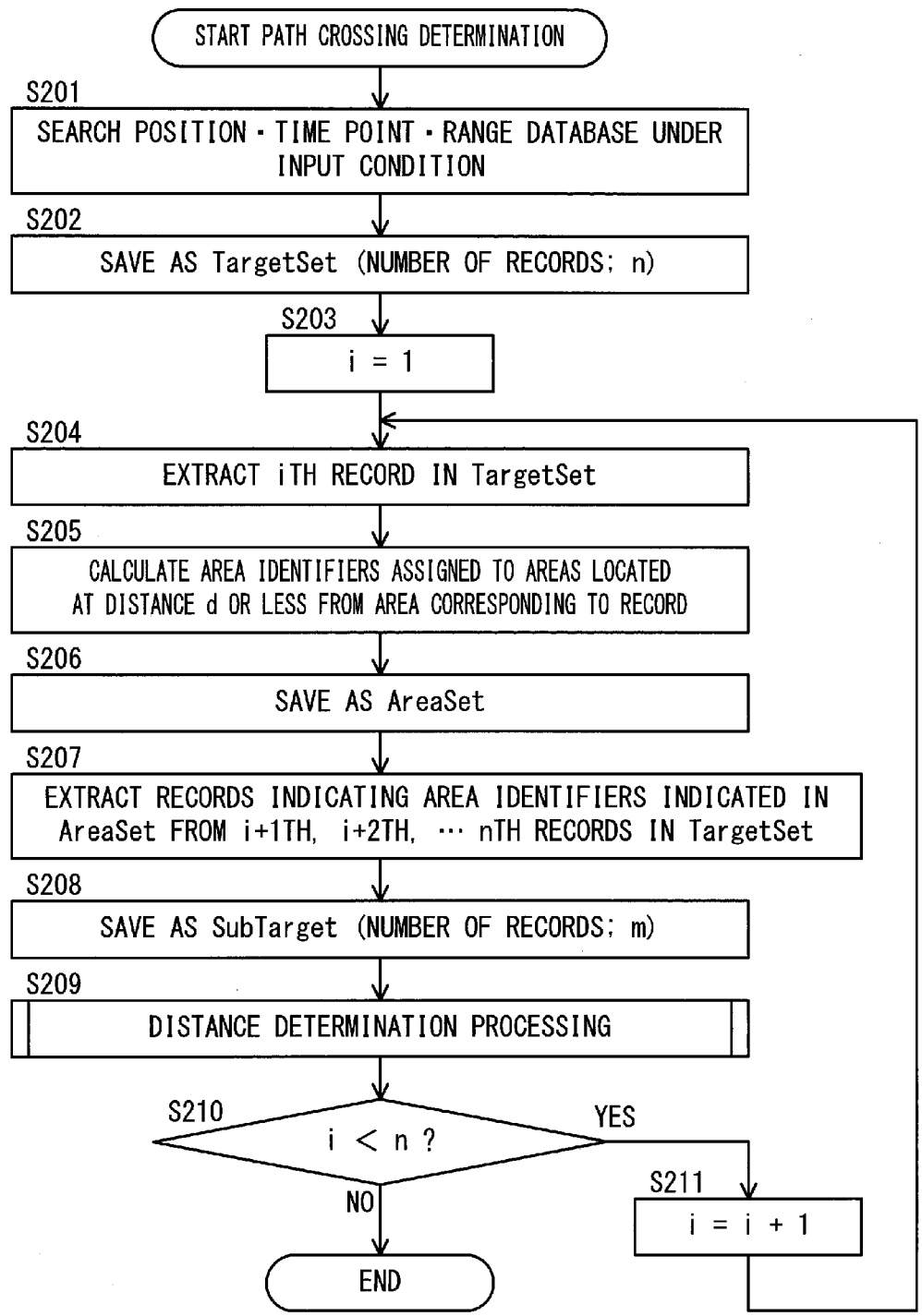
FIG. 9 presents a flowchart of the operation executed by a path crossing determination processing unit.
Figure 10:
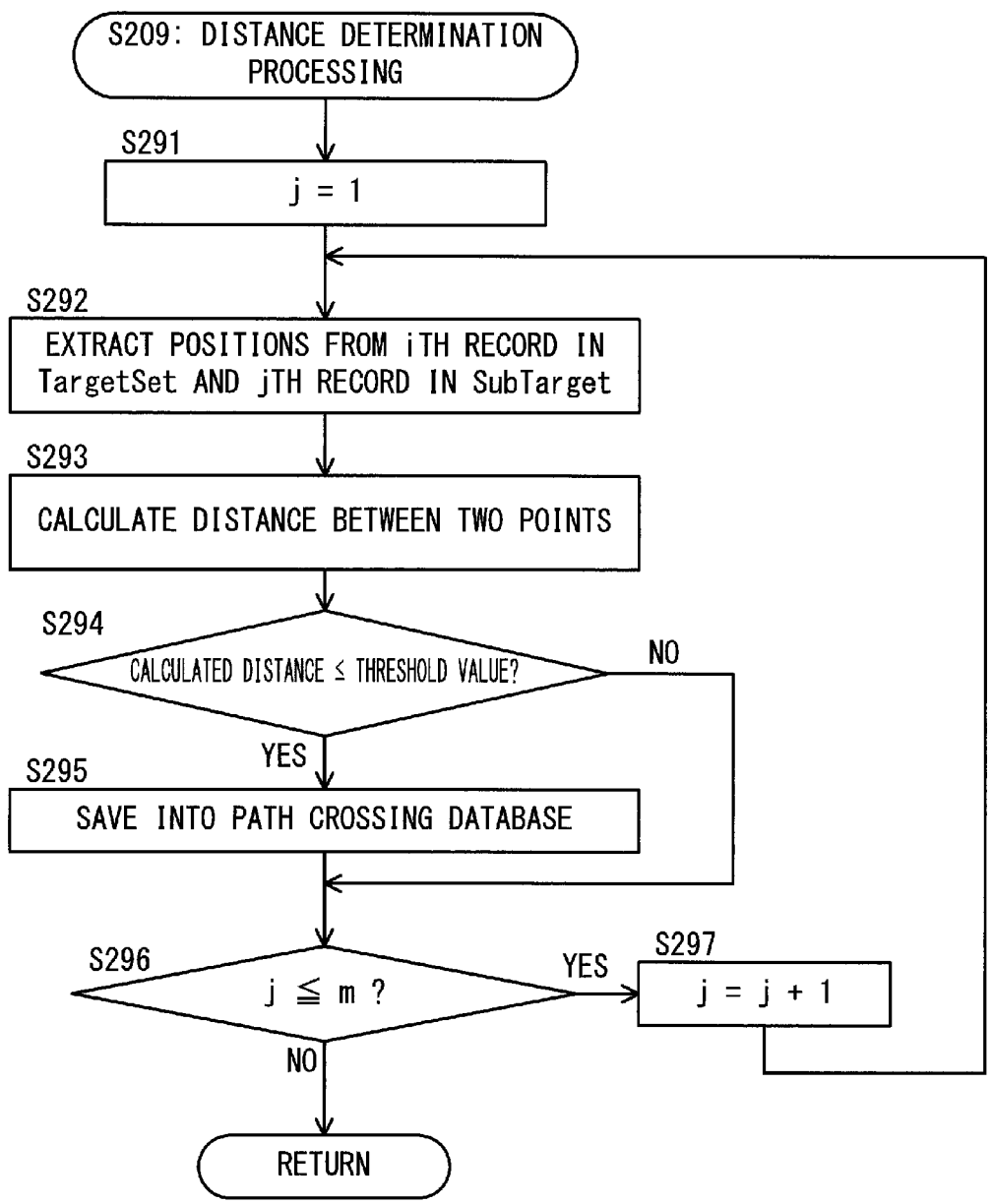
FIG. 10 shows a subroutine from the flowchart presented in FIG. 9.

FIGS. 9 and 10 each presents a flowchart of the operation executed by the path crossing determination processing unit 21b. In response to the terminal narrowing down conditions and the path crossing determination conditions input thereto as operation command conditions from the application service processing unit 21c, the path crossing determination processing unit 21b starts operation. The terminal narrowing down conditions are those pertaining to the position acquisition time points or the time point identifiers corresponding to portable terminals 10. The path crossing determination conditions pertain to a specific number of areas for judging the path crossing state and a specific distance used to determine the path crossing state. The following explanation will be given by assuming that the application service processing unit 21c has specified the terminal narrowing down conditions by using time point identifiers. The CPU in the arithmetic processing unit 21 is responsible for carrying out the execution of the various steps described below.

In step S201, the path crossing determination processing unit 21b searches through the position • time point • range database 22b and extracts records appended with the time point identifiers specified by the application service processing unit 21c. For instance, it may extract records each appended with a time point identifier "2014-10-10_080", "2014-10-10_081" or "2014-10-10_082". The operation then proceeds to step S202.

In step S202, the path crossing determination processing unit 21b temporarily saves the records having been extracted in step S201 as TargetSet, and then the operation proceeds to step S203. The description will be provided by assuming that the number of records having been extracted in step S201, i.e., the number of records saved as TargetSet, is n.

In step S203, the path crossing determination processing unit 21b substitutes 1 for i that is a variable representing the current processing target record among the records saved as TargetSet, before the operation proceeds to step S204.

In step S204, the path crossing determination processing unit 21b reads the ith record from TargetSet and then the operation proceeds to step S205.

In step S205, the path crossing determination processing unit 21b calculates the area identifiers corresponding to areas set apart from the area identified with the area identifier appended to the record having been read in step S204 by extents equal to or less than the number of areas specified by the application service processing unit 21c. For instance, if the area identifier assigned to the reference area is "aad-003" and the number of areas specified by the application service processing unit 21c is one, nine area identifiers "aac-002", "aac-003", "aac-004", "aad-002", "aad-003", "aad-004", "aae-002", "aae-003" and "aae-004" will be calculated in conjunction with a position • time point • range database such as that shown in FIG. 6.

In step S206, the path crossing determination processing unit 21b temporarily saves the area identifiers having been calculated in step S205 as AreaSet, before the operation proceeds to step S207.

In step S207, the path crossing determination processing unit 21b extracts any record succeeding the ith record in TargetSet, the area identifier of which matches one of the area identifiers in AreaSet, and then the operation proceeds to step S208. In this step, the search target records are limited to those succeeding the ith record so as to prevent a given combination of portable terminals 10 set apart from each other by a distance equal to or less than the predetermined value from being extracted twice.

In step S208, the path crossing determination processing unit 21b temporarily saves the records having been extracted in step S207 as SubTarget, and then the operation proceeds to step S209. An explanation will be given by assuming that the number of records saved as SubTarget is m.

In step S209, the path crossing determination processing unit 21b executes distance determination processing as shown in the flowchart presented in FIG. 10 and then, upon completing the distance determination processing, the operation proceeds to step S210. This processing will be described later in reference to FIG. 10.

In step S210, the path crossing determination processing unit 21b makes a decision as to whether or not the value taken for i, i.e., the variable representing the processing target record in TargetSet, is smaller than n, indicating the number of records in TargetSet. Upon deciding that the value is smaller than n, the operation proceeds to step S211, whereas upon deciding that the value is equal to n, the processing executed as shown in the flowchart in FIG. 9 ends.

In step S211, the path crossing determination processing unit 21b increments the variable i by 1, i.e., shifts to the next record in TargetSet and designates it as the processing target, before the operation returns to step S204.

FIG. 10 presents a detailed flowchart of the distance determination processing executed in step S209 in FIG. 9.

In step S291, the path crossing determination processing unit 21b substitutes 1 for j that is a variable representing the processing target record in SubTarget and then the operation proceeds to step S292.

In step S292, the path crossing determination processing unit 21b extracts the latitudes and the longitudes from the ith record in TargetSet and the jth record in SubTarget, before the operation proceeds to step S293.

In step S293, the path crossing determination processing unit 21b calculates the distance between the points corresponding to the two records as expressed in expression (1) below by using the two sets of latitude/longitude information having been extracted in step S292.

$$D = \sqrt{(M*dP)*(M*dp) + (N*\cos(P)*dR)*(N*\cos(P)*dR)} \tag{1}$$

It is to be noted that the variables in expression (1) are defined as follows. D: distance (m) between two points, P: average of latitudinal values for two points, dP: difference between latitudinal values for two points, dR: difference between longitudinal values for two points $M=6334834/\text{sqrt}((1-0.006674*\sin(P)*\sin(P))^3)$
$N=6377397/\text{sqrt}(1-0.006674*\sin(P)*\sin(P))$ It is to be noted that sqrt( ), sin( ) and cos( ) in expression (1) respectively indicate a square root function, a sine function and a cosine function. In addition, M represents the Meridian radius of curvature and N represents the Prime Vertical radius of curvature.

The operation subsequently proceeds to step S294.

In step S294, the path crossing determination processing unit 21b makes a decision as to whether or not the distance having been calculated in step S293 is equal to or less than the distance specified by the application service processing unit 21c as the determination criteria at which the portable terminals are determined to be in a path crossing state. Upon deciding that the two points are set apart from each other by a distance equal to or less than the specified distance, the operation proceeds to step S295, whereas upon deciding that the distance between the two positions is greater than the specified distance, i.e., greater than the path crossing determination criterion threshold value, the operation proceeds to step S296.

In step S295, to which the operation proceeds after deciding that the distance is equal to or less than the threshold value, the path crossing determination processing unit 21b stores the terminal ID, the position information and the position acquisition time point entered in the ith record in TargetSet and the terminal ID and the position information entered in the jth record in SubTarget into the path crossing information database 22c, and then the operation proceeds to step S296.

In step S296, the path crossing determination processing unit 21b makes a decision as to whether or not the value taken for j, i.e., the variable representing the processing target record in SubTarget, is equal to or smaller than m, indicating the number of records in SubTarget. Upon deciding that the value is equal to or smaller than m, the operation proceeds to step S297, whereas upon deciding that the value is greater than m, the processing executed as shown in the flowchart in FIG. 10 ends.

In step S297, the path crossing determination processing unit 21b increments the variable j by 1, i.e., shifts to the next record in SubTarget, and designates it as the processing target, before the operation returns to step S292.

(Applications)

The application service processing unit 21c at the server 20 is capable of executing various applications based upon the distances between the portable terminals.

For instance, a game may be played based upon such distances through coordinated operation executed by the application service processing unit 21c at the server 20 in coordination with a client program installed in the portable terminals 10. In this type of game, portable terminals 10 executing the client program may compete against each other or may exchange items as they cross paths.

The following advantages are achieved through the embodiment described above.

(1) The server 20 comprises the communication unit 23 that receives position information from a plurality of terminals each capable of calculating the position of the particular terminal, indicated by latitudinal and longitudinal coordinates, the area determination processing unit 21a that makes a decision, based upon the latitudes and longitudes indicated in the position information received at the communication unit 23, as to in which area among the predefined areas a given terminal is located, and a separation determination unit (executing the processing in step S207 in FIG. 9) that calculates the extent to which the area where one terminal is located and the area where another terminal is located are apart from each other and makes a decision as to whether or not a predetermined relationship is achieved with regard to the extent of separation between these terminals.

The server 20 configured as described above determines the extent to which the terminals are apart from each other based upon area classifications assigned to the areas where the individual terminals are located, and thus is able to identify with ease terminals located within a predetermined distance from each other or terminals apart from each other by a distance equal to or greater than the predetermined distance even when there are numerous determination target terminals. There is no limit imposed with regard to the number of terminals designated as determination targets in the terminal distance determination system 1, which includes the server 20 and such a system will be able to make decisions with regard to path crossing states for as many as several hundred million terminals. An advantage of the terminal distance determination system 1 that includes the server 20 is gained over the method that requires the distances between all the terminals to be calculated, in that the calculation volume is reduced by a greater extent as the number of processing target terminals increases.

(2) The area determination processing unit 21a in the server 20 appends an area identifier to each area so as to enable calculation of the extents of separation. The separation determination unit calculates the extent to which areas are apart from each other by using the area identifiers assigned thereto (step S207 and FIG. 9).

In other words, the extent of separation between areas can be calculated through a few addition/subtraction operations executed based upon the assignment rules through which the area identifiers are assigned.

(3) The server 20 further includes a distance determination unit (executing the processing in step S209 in FIG. 9) that calculates, as expressed in expression (1), for instance, the distance between the one terminal and the other terminal having been determined by the separation determination unit (step S207 and FIG. 9) to be in the predetermined relationship with each other and makes a decision as to whether or not a predetermined relationship is achieved with regard to the distance thus calculated, i.e., whether the calculated distance is smaller or greater than a distance threshold value.

Thus, once candidates are efficiently narrowed down by using the area identifiers, a more accurate distance can be calculated and an exact decision as to whether or not the two points are within a distance equal to or less than the predetermined distance can be made.

The embodiment described above allows for the following variations.

(1) While an area is determined through calculation executed in line with the area definition 22d in the embodiment described above, areas may be defined through a method other than this. For instance, a lookup table having the smallest values and the largest values pertaining to the latitude and the longitude of each area recorded therein may be prepared in advance and the area where a given portable terminal 10 is located may be determined by referencing this lookup table.

(2) In the embodiment described above, terminals to undergo distance calculation and path crossing determination are narrowed down by evaluating the extent to which areas are set apart from each other based upon the number of areas setting them apart. However, the present invention is not limited to the example and the extent to which areas are set apart from each other may be evaluated through another method. For instance, the latitude and the longitude at the center of each area may be calculated and the extent to which areas are set apart from each other may be evaluated as a specific distance calculated as expressed in expression (1) having been described in reference to the embodiment.

(3) While the embodiment has been described by assuming that the portable terminals 10 are mobile telephones, the present invention may be adopted in conjunction with portable terminals 10 other than mobile phones. Namely, the portable terminals 10 may be any portable or mobile communication devices such as tablet terminals, notebook computers or onboard terminals. In addition, such a portable terminal may be configured as an integrated part of a vehicle such as a bicycle, an automobile or an aircraft.

(4) While the distance between two points is calculated as expressed in expression (1) in the embodiment described above, the distance may be calculated through a method other than expression (1). For instance, it may be calculated by using a simpler approximation.

(5) The application executed by the application service processing unit 21c does not need to be a game. It may instead be an application that enables users in the path crossing state to exchange information or an application that enables tracking of the movement loci of portable terminals having been in the path crossing state at a specific position in the past.

(6) While the path crossing determination processing unit 21b in the embodiment described above starts operation in response to information that includes the number of areas for judging the path crossing state input thereto from the application service processing unit 21c, it may instead start operation even if no information indicating the number of areas for judging the path crossing state is input. In such a case, the path crossing determination processing unit 21b may calculate the number of areas separating portable terminals for judging a path crossing state by using the distance to be used as the path crossing state determination criterion, input thereto from the application service processing unit 21c, and the area definition 22d.

(7) In the embodiment described above, combinations of portable terminals, each made up with portable terminals apart from each other by a small extent or by a distance equal to or less than a predetermined distance, are identified. However, area-based determination and distance-based determination may be executed based upon reverse relationships so as to determine combinations of portable terminals each made up with portable terminals apart from each other by a distance equal to or greater than the predetermined distance.

(8) The application service processing unit 21c may include an area condition as another terminal narrowing down condition output to the path crossing determination processing unit 21b. For instance, the processing in step S201 in FIG. 9 may be executed in conjunction with an additional condition that the position information in each record to be extracted indicate a position located in a specified area. Namely, while TargetSet is created in the embodiment under a temporal condition imposed with regard to the records stored in the position • time point • range database 22b, TargetSet may instead be created by further applying an additional condition, i.e., a spatial condition, with respect to the records stored in the database.

(Variation 1)

While the server 20 includes the area determination processing unit in the embodiment described above, the functions of the area determination processing unit may be fulfilled at the portable terminals 10. In such a case, the area determination processing unit in each portable terminal 10 will be able to transmit the area identifier and the time point identifier, in addition to the subject position, the terminal ID and the current time, to the server 20.

The following advantage will be achieved through this variation.

(1) The terminal distance determination system 1 is configured with the server 20 and a plurality of portable terminals 10 connected via a network X. This system comprises the position calculation unit 14 that calculates the position indicated as the latitude and longitude of a portable terminal 10, the area determination processing unit 21a that identifies the area where the portable terminal 10 is located based upon the calculated position among a plurality of areas defined based upon the latitudes and the longitudes thereof and a path crossing determination processing unit 21b, i.e., a separation determination unit that makes a decision based upon the extent to which the area where the terminal is located and the area where another terminal is located are set apart from each other, as to whether or not a predetermined relationship is achieved with regard to the extent to which the terminals are set apart from each other. The path crossing determination processing unit 21b is included in the server, the position calculation unit 14 and the area determination processing unit 21a are included in each terminal, and the portable terminals 10 each transmit the area having been identified to the server 20.

This configuration makes it possible to lessen the load of processing executed by the server 20.

(Variation 2)

In the embodiment described above, the specific distance between portable terminals is calculated and a decision is made as to whether or not the portable terminals are located within a predetermined range from each other, as has been described in reference to the flowchart presented in FIG. 9. However, path crossing determination may be executed through a method other than this. For instance, instead of calculating the distance between the portable terminals, a decision may be made simply based upon the extent to which the areas where the individual portable terminals are located are set apart from each other. In such a case, processing should be executed as shown in the flowchart presented in FIG. 11 instead of the flowchart presented in FIG. 9, in reference to which the embodiment has been described.

Figure 11:
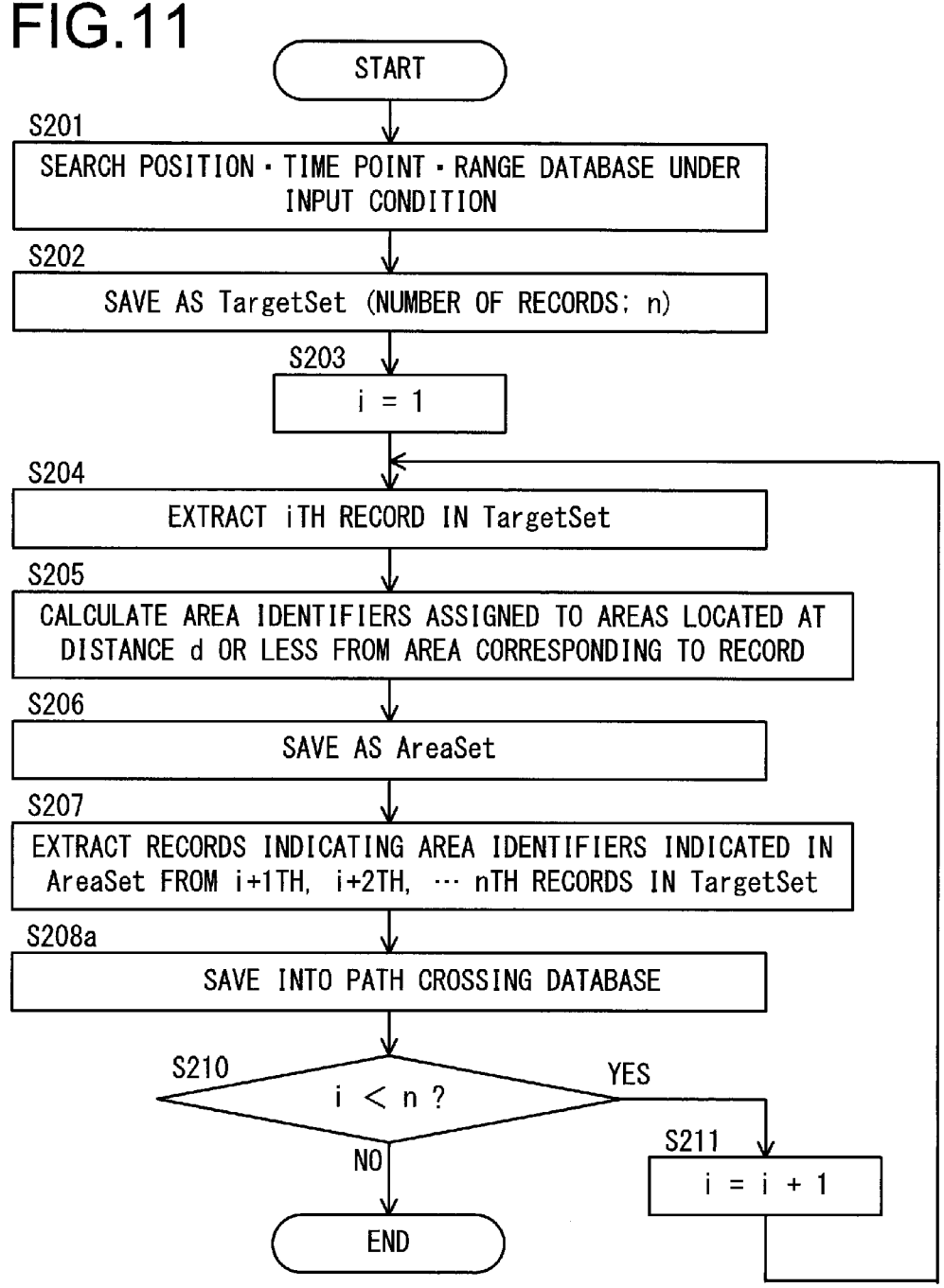
FIG. 11 presents a flowchart of the operation executed by the path crossing determination processing unit in variation 2.

FIG. 11 presents a flowchart of processing through which path crossing determination is executed simply based upon the extent to which the areas where portable terminals are located are set apart from each other. The flowchart includes step S208a replacing steps S208 and S209 in FIG. 9.

In step S208a, the terminal ID and the position information in any record having been extracted in step S207, as well as the terminal ID, the position information and the position acquisition time point entered in the ith record in TargetSet, are saved into the path crossing information database 22c, before the operation proceeds to step S210.

Variation 2 described above, in which path crossing determination is executed simply based upon the extent to which the areas where portable terminals are located are set apart from each other, simplifies the processing and thus enables the path crossing determination processing unit 21b to complete its processing in less time.

(Variation 3)

In the embodiment described above, the path crossing determination processing unit 21b executes the path crossing determination without factoring in the position acquisition time points. Namely, the path crossing determination processing unit 21*b* extracts records to undergo the path crossing determination based upon information pertaining to a specific temporal range having been received from the application service processing unit 21*c* and saves the extracted records as TargetSet (steps S201 and S202 in FIG. 9). Subsequently, it executes the path crossing determination processing without using any information pertaining to time points. As an alternative, the path crossing determination processing unit 21*b* may execute the path crossing determination by factoring in the position acquisition time points.

For instance, the application service processing unit 21*c* may further output an allowable temporal range as a condition included in an operation command issued to the path crossing determination processing unit 21*b*. Such an allowable temporal range may be indicated as a specific range of time such as a 30-minute range, or may be a time point identifier-based range, i.e., a time point identifier difference equal to or less than 1. Then, the path crossing determination processing unit 21*b* may save two records into the path crossing database only if the difference between the position acquisition time points indicated in the two records is equal to or within the specified allowable temporal range. Path crossing determination processing may be executed as shown in FIG. 12 by factoring in the difference between the position acquisition time points.

Figure 12:
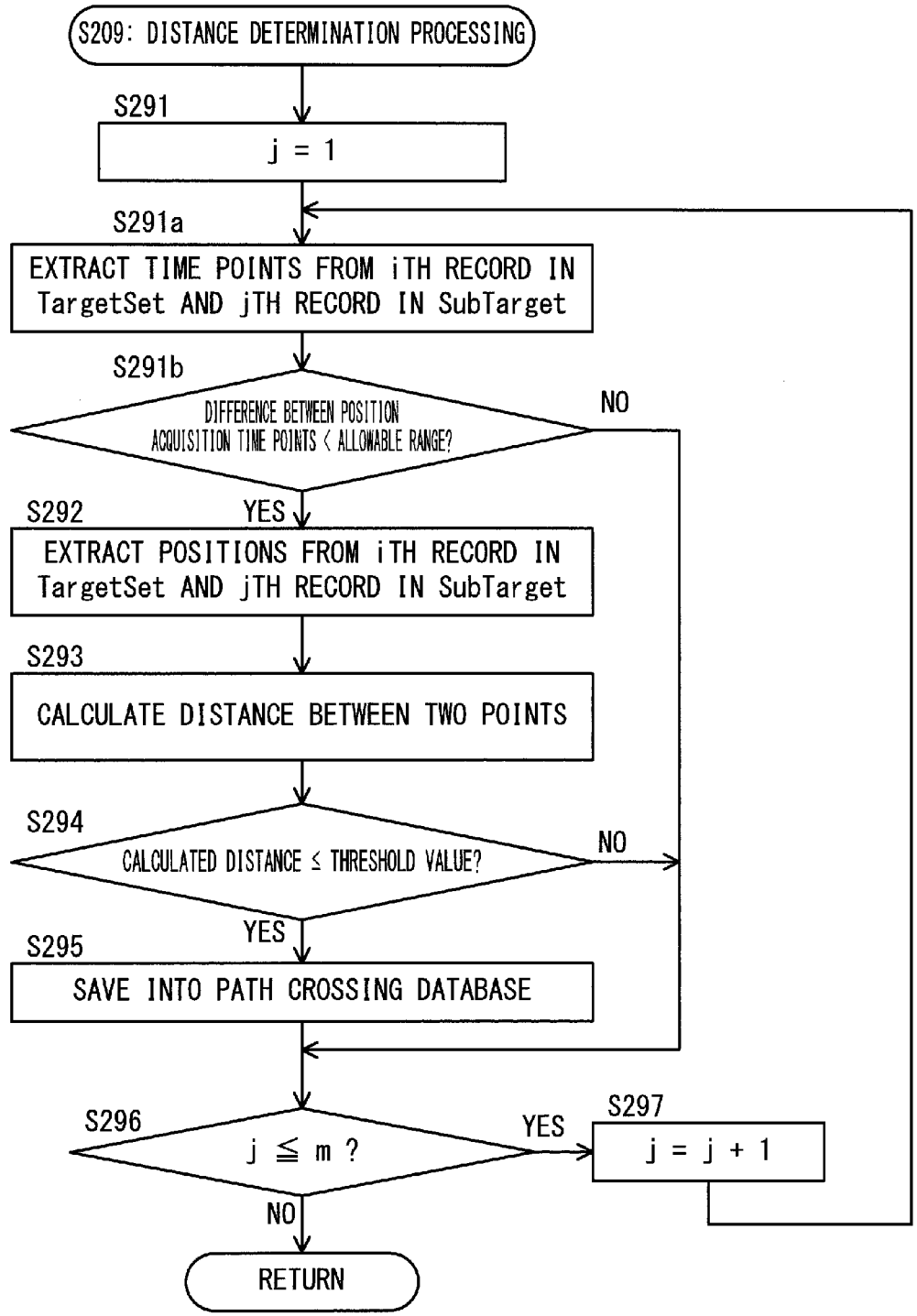
FIG. 12 shows the subroutine executed by the path crossing determination processing unit in the variation 3.

The path crossing determination processing unit 21*b* in Variation 3 executes processing through a procedure as written in the program in the flowchart presented in FIG. 12, instead of the program in the flowchart presented in FIG. 10 in reference to which the embodiment has been described. The flowchart in FIG. 12 differs from that in FIG. 10 in that the operation proceeds to step S291*a* instead of step S292 once step S291 has been executed.

In step S291*a*, the path crossing determination processing unit 21*b* extracts the position acquisition time points or the time point identifiers in the ith record in TargetSet and the jth record in SubTarget. It obtains the position acquisition time points if a time point difference has been specified as the allowable temporal range by the application service processing unit 21*c*, whereas it obtains the time point identifiers if a time point identifier difference has been specified. The operation then proceeds to step S291*b*.

In step S291*b*, the path crossing determination processing unit 21*b* compares the difference between the time points having been obtained in step S291*a* with the allowable temporal range having been specified by the application service processing unit 21*c*. Upon deciding that the difference between the position acquisition time points indicated in the two records is within the specified allowable temporal range, the operation proceeds to step S292, whereas upon deciding that the position acquisition time point difference matches or is beyond the allowable temporal range, the operation proceeds to step S296.

The following advantages are achieved through Variation 3.

(1) When a portable terminal 10 transmits the subject position, the position acquisition time point at which the particular position information has been obtained is also transmitted as appended information. The path crossing determination processing unit 21*b* (executing the processing in step S201 in FIG. 9), i.e., the separation determination unit, executes processing by designating terminals manifesting a position acquisition time point difference within a predetermined range, as processing targets.

Thus, data are recorded into the path crossing information database 22*c* only if the corresponding portable terminals 10 have been present within a distance equal to or less than a predetermined value from each other within a predetermined temporal range, and ultimately, their spatial and temporal proximity to each other can be extracted.

(2) The server 20 includes the area determination processing unit 21*a*, i.e., a time point identifier assigning unit, that assigns a common time point identifier to records received at the communication unit 23 indicating position acquisition time points falling within a predetermined temporal range. The path crossing determination processing unit 21*b*, i.e., a separation determination unit, executes processing on the terminals with a common time point identifier assigned by the time point identifier assigning unit by designating these terminals as processing targets.

This means that as the application service processing unit 21*c* indicates a specific condition that records share a common time point identifier, the path crossing determination processing unit 21*b* is able to make a decision as to whether or not the time-related condition is satisfied by checking whether or not the time point identifiers assigned to the individual records match, and as a result, the processing is simplified.

(Variation 4)

The server 20 in the embodiment described earlier holds various databases used in various types of arithmetic processing. However, the server 20 may assume a mode other than this. For instance, a single or a plurality of servers other than the server 20 may host and fulfill one or a plurality of databases and functions in the server 20, so as to configure an information processing device that achieves, as a whole, functions similar to those of the server 20.

Figure 13:
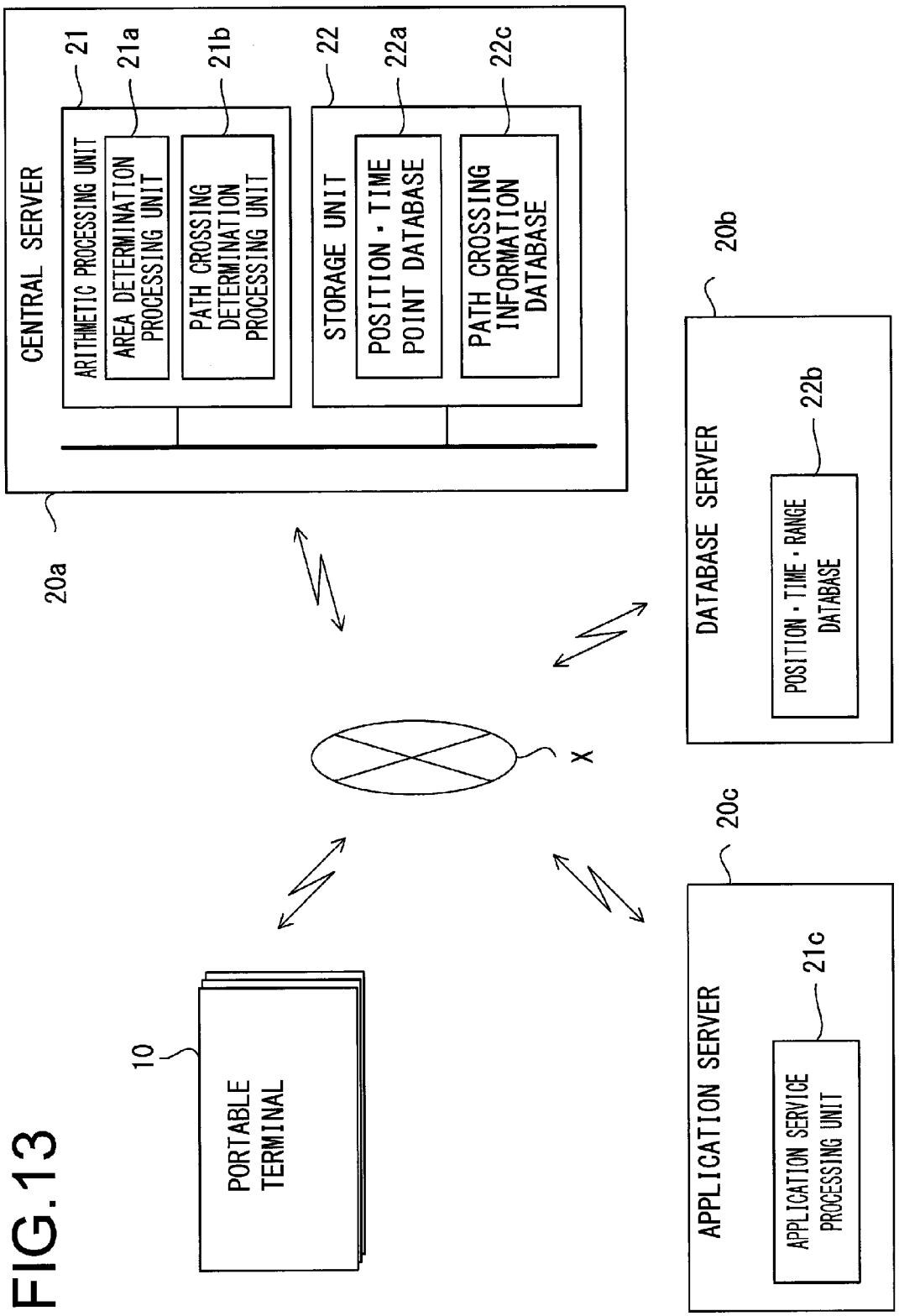
FIG. 13 is a block diagram illustrating the configuration of the terminal distance determination system achieved in variation 4.

FIG. 13 is a functional block diagram configured so that the functions of the server 20 in the embodiment described above are fulfilled in a plurality of servers, i.e., a central server 20*a*, a database server 20*b* and an application server 20*c*. Portable terminals 10, the central server 20*a*, the database server 20*b* and the application server 20*c* are connected via a network X. It is to be noted that FIG. 13 does not include an illustration of the structure of the portable terminals 10 as it is similar to that shown in FIG. 1 and does not include an illustration of the communication unit in each server.

A path crossing information database 22*c* is generated and utilized as described below in Variation 4.

Upon receiving the subject position, the terminal ID used as an inherent identifier and the current time point from a portable terminal 10, the central server 20*a* saves the data thus received into a position • time point database 22*a*. An area determination processing unit 21*a* in the central server 20*a* reads the data saved in the position • time point database 22*a* over predetermined time intervals and saves processing results into a position • time point • range database 22*b* in the database server 20*b*. As an operation start condition is input from an application service processing unit 21*c* in the application server 20*c*, a path crossing determination processing unit 21*b* in the central server 20*a* generates a path crossing information database 22*c* by using the position • time point • range database 22*b* held in the database server 20*b*. The application service processing unit 21*c* in the application server 20*c* reads the data in the path crossing information database 22*c* in the central server 20*a* and executes processing by designating, for instance, portable terminals 10 located in close proximity to each other, separated from each other by a distance equal to or less than a specified distance.

The central server 20a in Variation 4, which does not hold therein the position • time point • range database 22b where a large volume of data is bound to be accumulated over time, can be maintained with better ease. In addition, since the configuration includes the application server 20c having the application service processing unit 21c, which is installed as an independent entity, the central server 20a and the database server 20b are able to provide path crossing information based upon a command issued from an external source. Namely, path crossing information pertaining to portable terminals 10 can be provided to another server capable of executing various application programs as well as to the application server 20c.

(Variation 5)

Figure 14:
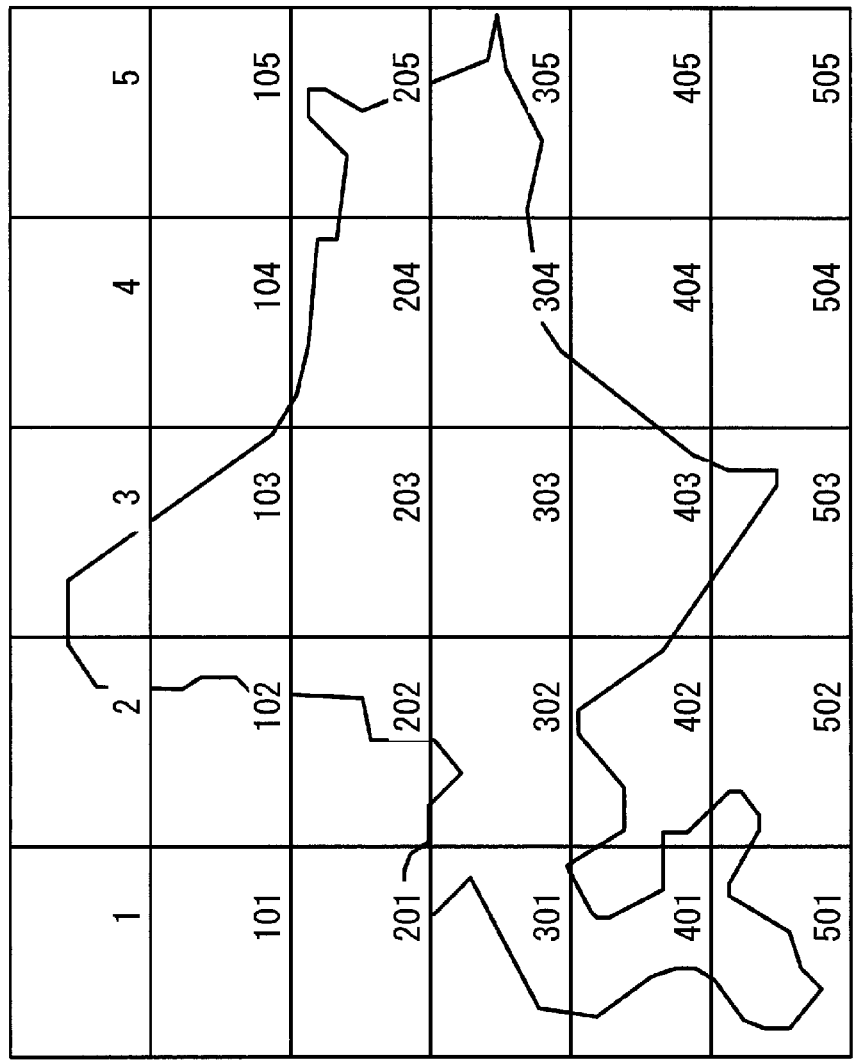
FIG. 14 presents examples of area identifiers assigned in variation 5.

In the embodiment described above, an area identifier is defined as a combination of a sign indicating the latitude and a sign indicating the longitude and such signs are made up with numerals and alphabetic letters. However, the present invention may be adopted in conjunction with area identifiers otherwise defined. For instance, an area identifier may include other types of letters set in an obvious order following a specific rule, such as hiragana or letters used in another language. In addition, an area identifier may include signs having a specific number of digits, each indicating a rounded value for the latitude or the longitude. Furthermore, instead of indicating the latitude and the longitude separately, numbers may be assigned in sequence, as shown in FIG. 14, so that successive numbers are designated to areas arranged next to one another along a row direction and that numbers manifesting a predetermined numerical difference (100 in the example presented in FIG. 14) are designated to areas arranged next to one another along a column direction. Such area identifiers, too, will enable calculation of the extent to which areas are apart from each other.

(Variation 6)

While the area definition 22d is saved in advance in the storage unit 22 in the embodiment described above, the arithmetic processing unit 21 may further include a definition editing unit 21d that edits the area definition 22d.

FIG. 15 is a block diagram illustrating the configuration of the terminal distance determination system achieved in variation 6. In FIG. 15, the same reference numerals are assigned to components identical to those in FIG. 1 and their descriptions will be omitted. The definition editing unit 21d, which functions as an area size specifying unit, is capable of specifying an area size. Such a definition editing unit 21d may accept an edit command issued by the application service processing unit 21c, prompting it to edit the area definition 22d. The definition editing unit 21d may further accept an edit command prompting it to edit the area definition 22d, via an input unit (not shown) or the communication unit 23 in the server 20.

The following advantage is achieved through Variation 6.

(1) The server 20 includes the area size specifying unit that specifies an area size. This means that the area size can be altered in correspondence to the distance used as the criterion when making a decision as to whether or not portable terminals are in the path crossing state as required by a specific application program executed by the application service processing unit 21c. The load of processing executed by the path crossing determination processing unit 21b can thus be lessened.

The embodiment and variations thereof described above may be adopted in various combinations.

While the invention has been particularly shown and described with respect to preferred embodiments thereof by referring to the attached drawings, the present invention is not limited to these examples and it will be understood by those skilled in the art that any other mode conceivable within the technical range of the present invention should be considered to be within the scope of the present invention. Namely, the following method, which may be adopted by the server 20, is also within the scope of the present invention.

In a terminal separation determination method adopted in the server 20, a decision is made, based upon position information indicating a latitude and a longitude calculated at a portable terminal 10, as to whether or not the portable terminal 10 is located within any of areas defined in advance based upon latitudes and longitudes thereof, the extent to which the area where one portable terminal is located and an area where another portable terminal is located are apart from each other is calculated, and a decision is made as to whether or not a predetermined relationship is achieved with regard to the extent to which these portable terminals are apart from each other.

Through the embodiments and variations of the present invention described above, terminals separated from one another by a predetermined extent, e.g., terminals located within a range equal to or less than a predetermined distance or over a range equal to or greater than a predetermined distance, can be identified from numeral terminals through a quick, simple procedure without having to calculate through arithmetic operation the distances between terminals.

What is claimed is:

1. A terminal separation determination system, comprising:
　a plurality of terminals each including an antenna and a position calculation unit that calculates position information of a respective terminal;
　a server, including a processor, a memory connected to the processor, that is connected to each of the plurality of terminals via a network,
　wherein the memory stores instructions that when executed by the processor, cause the processor to execute:
　a communication unit, connected to the processor, that receives position information which indicates a latitude and a longitude of a respective terminal from the plurality of terminals, and stores a record of each terminal that indicates a terminal identification, the position information received, and a position information acquisition time point,
　an area determination unit that:
　processes each record stored by the communication unit in successive predetermined periods of time,
　appends an area identifier to each record which identifies an area block, of a plurality of predefined area blocks, that the terminal is located based on the position information of the record, wherein each area block of the predefined area blocks are defined by a unit of longitude and a unit of latitude, and the predefined area blocks are arranged in a mesh pattern, and
　appends a time point identifier to each record indicating the predetermined period of time that the area determination unit processes the record to append the area identifier,
　a path crossing determination unit that:
　extracts a first set of records having a time point identifier that correspond with a first predefined condition indicating a time point,
　for each record in the first set of records, determine area identifiers of a predetermined number of area blocks that surround the area block of the record based on the mesh pattern of area blocks and store the area identifiers as a second set, extract records of the first set of records that have an area identifier that matches an area identifier in the second set and store as a third set of records, for each record in the first set of records, extract the position information of the record and the position information of each of the records within the third set of records extracted for the respective record and calculate respective distances between each record, determine whether each respective distance is less than or equal to a predetermined distance and store the records in a fourth set, wherein the terminals corresponding to each record in the first set exchange information with each of the terminals in the fourth set.

2. The terminal separation system according to claim 1, wherein if a respective distance is less than or equal to a predetermined distance the terminal identification, the position information, and the position information acquisition time point are stored and the terminal identification and position information for each record in the third set are stored.

3. The terminal separation system according to claim 1, wherein the time point identifiers are the same for two or more records if the records are processed by the area determination unit with the same period of time.

4. A terminal separation determination method of a terminal separation determination system including a plurality of terminals each including an antenna and a position calculation unit that calculates position information of a respective terminal; and a server, including a processor, a memory connected to the processor, that is connected to each of the plurality of terminals via a network, the method comprising:

receiving, by the server, position information which indicates a latitude and a longitude of a respective terminal from the plurality of terminals, and storing a record of each terminal that indicates a terminal identification, the position information received, and a position information acquisition time point, processing, by the server, each record stored by the communication unit in successive predetermined periods of time, appending, by the server, an area identifier to each record which identifies an area block, of a plurality of pre-defined area blocks, that the terminal is located based on the position information of the record, wherein each area block of the predefined area blocks are defined by a unit of longitude and a unit of latitude, and the predefined area blocks are arranged in a mesh pattern, appending, by the server, a time point identifier to each record indicating the predetermined period of time that the area determination unit processes the record to append the area identifier, extracting, by the server, a first set of records having a time point identifier that correspond with a first predefined condition indicating a time point, for each record in the first set of records, determining, by the server, area identifiers of a predetermined number of area blocks that surround the area block of the record based on the mesh pattern of area blocks and store the area identifiers as a second set, extracting, by the server, records of the first set of records that have an area identifier that matches an area identifier in the second set and store as a third set of records, for each record in the first set of records, extracting, by the server, the position information of the record and the position information of each of the records within the third set of records extracted for the respective record and calculate respective distances between each record, determining, by the server, whether each respective distance is less than or equal to a predetermined distance and store the records in a fourth set, exchanging information, by each record in the first set, with each of the terminals in the fourth set.

* * * * *